(12) United States Patent
Buffet

(10) Patent No.: US 9,333,847 B1
(45) Date of Patent: May 10, 2016

(54) HYBRID VEHICLE HAVING AN ENGINE AND A FLYWHEEL WHICH ALTERNATIVELY DRIVE THE VEHICLE AT LOW SPEED IN A PULSATILE WAY

(71) Applicant: Denis Ernest Celestin Buffet, Paris (FR)

(72) Inventor: Denis Ernest Celestin Buffet, Paris (FR)

( * ) Notice: Subject to any disclaimer, the term of this patent is extended or adjusted under 35 U.S.C. 154(b) by 28 days.

(21) Appl. No.: 14/538,590

(22) Filed: Nov. 11, 2014

(51) Int. Cl.
*B60K 6/48* (2007.10)
*B60K 6/30* (2007.10)
*B60K 6/445* (2007.10)
*B60K 6/10* (2006.01)

(52) U.S. Cl.
CPC . *B60K 6/48* (2013.01); *B60K 6/105* (2013.01); *B60K 6/445* (2013.01); *Y02T 10/623* (2013.01); *Y02T 10/6239* (2013.01)

(58) Field of Classification Search
CPC .......... B60K 6/48; B60K 6/105; B60K 6/445; Y02T 10/623; Y02T 10/6239
See application file for complete search history.

(56) References Cited

U.S. PATENT DOCUMENTS

| | | | | |
|---|---|---|---|---|
| 6,376,927 B1 * | 4/2002 | Tamai | .................... | B60K 6/383 290/31 |
| 6,487,998 B1 * | 12/2002 | Masberg | ................. | B60L 7/003 123/192.1 |
| 8,326,479 B2 * | 12/2012 | Martin | .................. | B60W 10/06 123/332 |
| 2012/0197472 A1 * | 8/2012 | He | ......................... | B60K 6/105 701/22 |
| 2012/0309575 A1 * | 12/2012 | Buffet | .................... | B60K 6/105 475/5 |

* cited by examiner

*Primary Examiner* — Michael J Zanelli

(57) ABSTRACT

A hybrid vehicle having a series-parallel architecture, i.e. a mechanic (gears) and an electric (generator (4), inverter (7), and motor (6)) propulsion chains associated by a planetary gear mechanism (2) powered by an engine (1). The generator rotor (4), with or without a flywheel (3), provides a kinetic energy storage due to its high inertia and speed. The stored energy is sufficient to drive simultaneously, the vehicle at low speed, and the not-fueled engine (1), during short periods. Between these periods, the fueled engine drives the vehicle and restores the stored kinetic energy. The succession of these periods made operation pulsatile at higher maximum power. Higher power means better efficiency. In addition, less pollution and perturbation compare to the "stop and start" are expected.

8 Claims, 9 Drawing Sheets

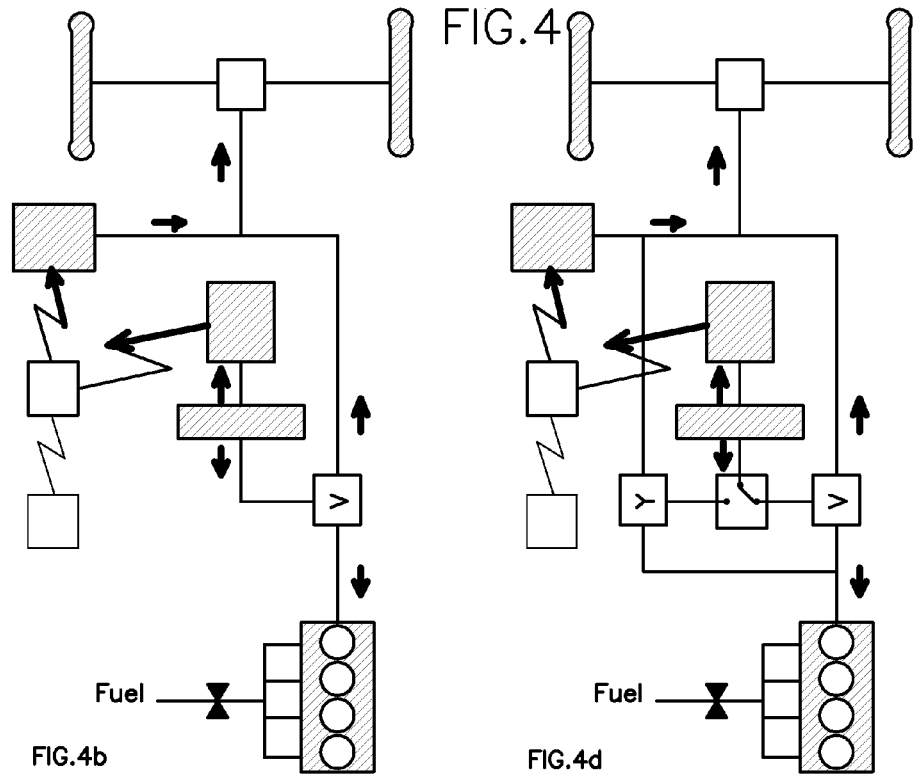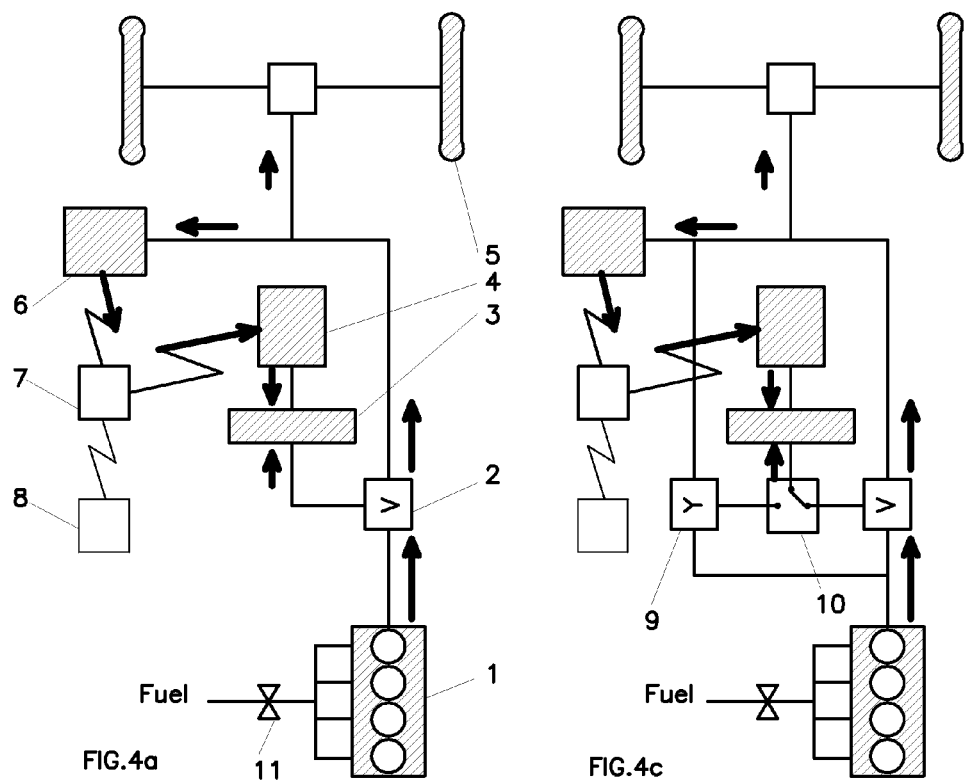
FIG. 4

HYBRID MODE LOW SPEED

HYBRID PULSATILE MODE

HYBRID VEHICLE HAVING AN ENGINE AND A FLYWHEEL WHICH ALTERNATIVELY DRIVE THE VEHICLE AT LOW SPEED IN A PULSATILE WAY

TECHNICAL FIELD

The present invention relates to hybrid vehicles at low speed thus at low resistive power. At low power, engine efficiency is poor. The invention intends to improve this situation.

BACKGROUND OF THE INVENTION

The U.S. Pat. No. 8,845,469 B2 filled May 31, 2011, describes a double planetary gear mechanism for hybrid vehicles, while the U.S. Pat. No. 8,840,499 B2 filled Feb. 13, 2012 is about how to store and recover kinetic energy from the generator rotor. The present invention combines the two devices and makes them work on a pulsatile way that is new.

Compare to the French patent application FR 14/01 126 filled on May 19, 2014 about the same topic, the present invention is more complete. Particularly in a new option, the invention is applied to the thermodynamic cycles in each engine cylinder instead to the whole engine.

The hybridization of a vehicle consists to associate a thermal propulsion chain to an auxiliary propulsion chain which can be electric, hydro pneumatic or mechanic. The auxiliary propulsion chain allows shifting the operating point of the thermal propulsion chain to make it work under better conditions at higher efficiency. Generally, best efficiency is obtained by lowering engine speed and by increasing its torque for the same output power. Unfortunately, at low vehicle speed, the engine speed can't be lowered below its stability limit, around 800 rpm. That limits benefit of vehicle hybridization. The usual solution at low speed is to stop the thermal propulsion chain and to continue with the auxiliary propulsion chain only. This last is less powerful and well adapted to low power. Of course, this option is limited by the stored energy to be consumed in the auxiliary propulsion chain, and the engine has to be restarted soon. This technique is commonly known as "stop and start." If the storage capacity is small, frequency of the stops and starts has to be high, looking as pulsations.

Stop and start technique is used whatsoever power-train architecture is: parallel, series, series-parallel, etc. . . . and whatsoever auxiliary energy is: electric, mechanic, hydra-pneumatic, etc. . . . . But, it has some important disadvantages. Numerous stops and starts disturb smooth driving and punctually increase fuel over-consumptions and CO2 emissions. Benefit balance is not always positive. It depends of the driving style and the road profile. In addition, heavy and costly energy storages are required.

In the patent application FR 12 58707 dated Sep. 17, 2012, WO 2014/041275 A1 issued on Mar. 20, 2014, the low capacity of hydra-pneumatic storage is compensated by frequent engine stops and starts. Higher the frequency is, less positive the benefit balance is.

Many power-train architectures and storage types exist. Some are marketed on a large scale. A flywheel coupled to the vehicle wheels through a speed variation system, such as KERS, is one of them. Unfortunately, this technique requires high speed flywheels to store enough energy and high-techs to stand the centrifugal stress. Applications are limited to specific cases: race cars, frequent stop bus . . . . Differently to the state of art, the patent application U.S. Ser. No. 13/371,697 considers energy storage in the generator rotor, with or without an additional flywheel, driven by the pilot shaft (the 3rd shaft) of a planetary gear mechanism. First, we get a multiplication effect on speed variations thus on stored energy. Second, a speed variation system has not to be provided. Third, same for a system to extract power, which is the Generator stator itself. Consequently, the flywheel speed is moderate and technology is kept basic.

"cylinders on demand" system has similitude with stop and start system. Some engine cylinders are stopped or restarted according to power requirements.

The purpose of the present invention is to improve the here above techniques, at low vehicle speed, particularly regarding costs, efficiency and CO2 emissions.

BRIEF SUMMARY OF THE INVENTION

The patent application U.S. Ser. No. 13/371,697 shows how to store kinetic energy in the generator rotor of a hybrid power-train. In the present invention, the stored kinetic energy is sufficient to drive simultaneously the vehicle, the generator and the engine, during a short period. During the next period, the engine drives the vehicle and restores kinetic energy to the flywheel.

The succession of these periods creates pulsations with:
 active phases in which the fuel supply for the engine is open, and the fueled engine drives the vehicle, the generator and the flywheel,
 passive phases in which the fuel supply for the engine is closed, and the stored kinetic energy drives the vehicle, the generator and the not-fueled engine.

For simplification in the following explanations, "the flywheel" refers to the generator rotor, which has a high inertia or which is coupled to a flywheel. When the fuel system is "open," it does not mean that the fuel is arriving inside cylinders. It just means that the engine fuel system is allowed to send fuel inside the cylinders at the right time. Same, when the fuel system is "closed" or "shut," the engine fuel system is not allowed to send fuel inside the cylinders at any time.

The invention principle can be applied to the whole engine or to individual engine cylinders. In each cylinder during active phase, thermodynamic cycles remain active when they are active and passive when they are passive. During passive phase, all thermodynamic cycles are or become passive. The advantage from the cylinder arrangement compared to the global engine arrangement is that the frequency of the active thermodynamic cycles can be higher for better propulsion regularity and lesser torsion vibration. For that, phase displacement of the phases in each cylinder has to be optimized according to the limited possibilities offered by the original stalling of the engine and their best distribution. To sum up, each engine cylinder is cyclically fueled to create, active phases where thermodynamic cycles are unchanged except power, and passive phases where active thermodynamic cycles become passive, with phase displacements in each cylinder.

During the active phases, the succession of the passive and the active thermodynamic cycles is still the same whatsoever we are in pulsatile or non-pulsatile mode. Only cycle power is increased to compensate the loss of power in the passive phases. During the passive phases, the number of the passive cycles increases along with the length of the phases. The ratio between the number of active thermodynamic cycles and the number of passive thermodynamic cycles determines the power and the torque capabilities of the engine. The power of the passive thermodynamic cycles is negative, almost null due to internal engine friction and air compression losses. These last are already low under no fired load, but they can be minimized by keeping the suction or the exhaust valves open during the passive phases in order to remove useless air compressions and associated losses in the cylinders.

At contrary, the engine suction or the exhaust valves can get an opening during air compression in the passive phases in order to increase engine losses and to control the reverse torque at the engine shaft. To get additional engine braking "on demand" is very interesting because powerful regenerative braking or flywheel propulsion induces reverse torques at the engine shaft through the planetary gear mechanism. While engine braking torque, has a negative effect in normal propulsion.

In another way of using the invention, the passive phases go partially below the stability limit for the engine speed. In fact, the flywheel provides some stability to the engine. Thus, the average speed of the engine can be lowered, that implies less friction power and even fewer thermodynamic losses within the engine.

To describe the power-train according to the invention it comprises:
- a first planetary gear mechanism for power derivation, having an input shaft, an output shaft and a pilot shaft,
- an electric generator connected to the pilot shaft, having a high inertia rotor or a rotor coupled to a flywheel,
- an electric motor able to absorb power from the generator coupled to the output shaft driving the vehicle axle,
- a battery able to absorb or to release the electric power balance of the vehicle,
- an engine, including an engine shaft connected to the input shaft of the planetary gear mechanism to provide power to the system,
- a valve system for cyclically shutting down the fuel supply for the engine,
- an inverter able to transfer and to control electrical energy between the generator and the motor both reversible,
- a control-command unit of the system.

The device according to the invention is particularly recommended for a power-train with a double planetary gear mechanism for power derivation, as described in the U.S. Pat. No. 8,845,469 and U.S. Pat. No. 8,840,499. In these arrangements, power in the electric propulsion chain is roughly divided by two compare to known architectures with only one planetary gear mechanism, and speed variations of the shafts are more suitable for flywheel efficiency.

Comparing to the previous architecture, the double planetary gear mechanism architecture comprises in addition:
- a second planetary gear mechanism for power derivation with a higher gear ratio than the first planetary gear mechanism, having an input shaft and an output shaft respectively connected to the input shaft and the output of the first planetary gear mechanism,
- a selector for choosing one of the first and the second planetary gear mechanism to be in operation by connecting the relevant pilot shaft to the generator rotor.

To maintain a continuous vehicle speed while the flywheel is decelerating, the engine has to slow down a little bit and then to re-accelerate at the pulsation rhythm following the Willis formula establishing shaft speeds in a planetary gear mechanism. Negative gear ratio determines adequate direction for speed variations of the flywheel. It's important to point out that the engine is never totally stopped or restarted at each pulsation like in the patent application FR 12 58707.

As the engine is never completely turned off or restarted, we get, little perturbation on propulsion and quicker availability for any call of power. In addition, the pulsation frequency can be higher than in a classic stop and start system that improves engine regularity.

Global efficiency is improved, because required power during the active phases is higher than the average power. It is well known that an engine has a higher efficiency at high torque and low speed than at low torque and high speed. Higher power means a higher temperature for the thermodynamic cycles and a better efficiency according to the Carnot's law. In addition, no load during the passive phases makes engine frictions and thermodynamic losses lower even if they are increased a little bit during the active phases.

A sequencer in the control unit triggers the active and the passive phases and provides calculation resources. During a sequencer period, the invention arrangement makes possible to calculate resistive power and even power in all the shafts from the speed behavior of the flywheel during the previous sequencer period. Thanks to the flywheel, we have an accurate reference which does not change during vehicle lifetime and does not depend upon external conditions.

The vehicle inertia may change in a +/−10% range due to vehicle load variations. When the engine speed is constant during a sequencer period, there is a mathematic relation between the flywheel inertia and the actual inertia of the vehicle. As the flywheel is a good reference, corrected vehicle inertia can be introduced in the following calculations. We can also calculate the actual mass and load of the vehicle with the same method.

The present invention adds a pulsatile mode to the five optional modes already described in the U.S. Pat. No. 8,840,499. The choice of the mode is partially manual and partially computerized in the control unit following preloaded criteria. For instance, low resistive power during a pre-set period initiates pulse mode and a quick pressure on the accelerator pedal shifts pulse mode into hybrid mode at low speed.

The accelerator pedal has different effects in each mode, while the driver should always have the same acceleration feeling, and propulsion power should be maintained during the shifting, whatsoever the mode in operation. An electronic convertor corrects the pedal position according to the mode in order to meet such conditions.

The here above fuel supply is either open or closed. But, the invention can also work at cycling flow rate. If so, the fuel flow is maximum during the active phase and minimum during the passive phase which is no longer totally passive.

BRIEF DESCRIPTION OF THE DRAWINGS

FIG. 2.

FIG. 3.

DETAILED DESCRIPTION OF THE INVENTION

Figure 1:
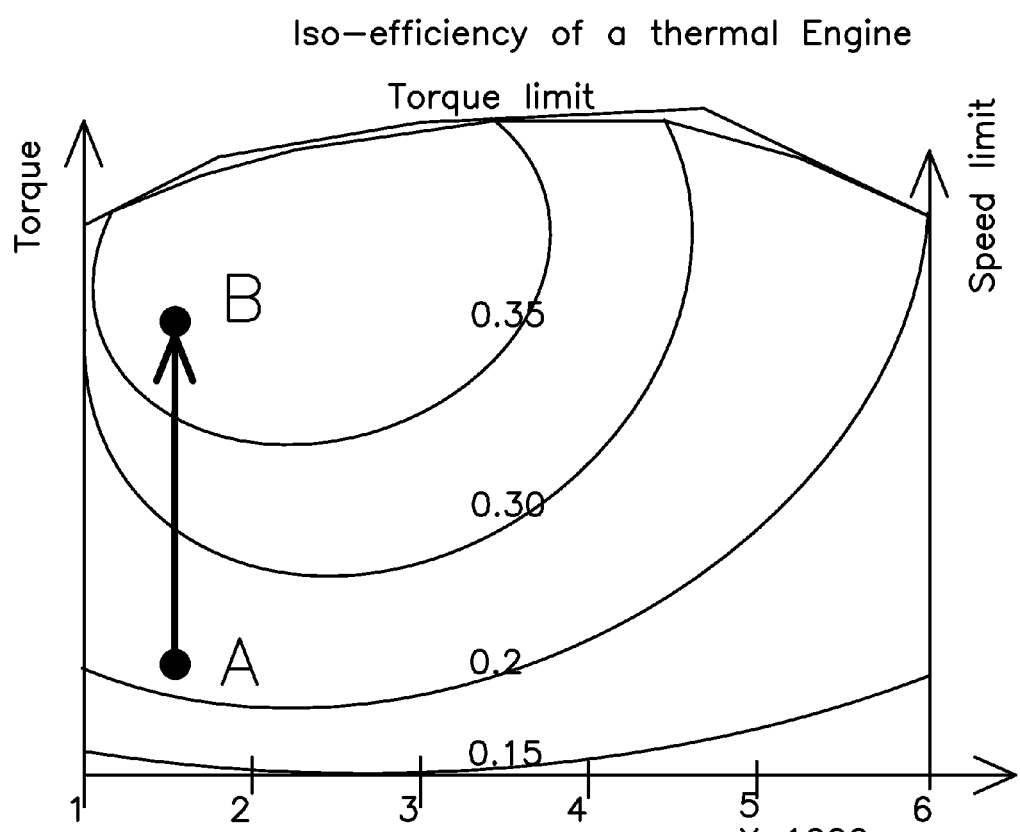
FIG. 1 shows a typical graph of the engine efficiency.

The U.S. Pat. No. 8,840,499 B2 filled Feb. 13, 2012 describes how to store and recover kinetic energy from the generator rotor of a series-parallel power-train of a hybrid vehicle. The present invention makes the system work on a pulsatile mode.

At low vehicle speed, therefore, at low resistive power, the system becomes cyclic. The cycle is split into: an active phase, where the engine provides not only energy for vehicle propulsion but also energy for accelerating the flywheel; and a passive phase, where only the energy stored in the flywheel propels the vehicle and the not-fueled engine. The fuel supply is thus cyclic, alternatively open and closed. The interest is to make the engine work, when it works, at a higher power than the average power therefore, with a better efficiency according to the engine characteristics. In addition, engine losses are minimized during the passive phases and compensated by energy previously produced at a higher power at a better efficiency. At higher vehicle speed, the engine has not to be cyclic because required power is sufficient for getting a good efficiency.

When installed on each engine cylinder, the device determines the number of active and passive thermodynamic cycles in the cylinders. Only the passive phase makes the active thermodynamic cycles become passive while they are unchanged during the active phase except power. When the period of fuel shutting is increasing, we get more passive thermodynamic cycles for the same number of active thermodynamic cycles. Usually, the passive phases are longer than the active phases.

For maintaining a continuous vehicle speed while the flywheel is decelerating to deliver its energy, the engine has also to slow down a little bit and then to re-accelerate at the pulsations rhythm. The device has an advantage: An important part of the energy required for reaccelerating the engine is directly supplied by the flywheel through the gears with a high efficiency. Same when the engine has to reaccelerate the flywheel. That eases the work of the battery comparing to a classic stop and start system.

The phase displacement in each cylinder must take into account the original stalling of the engine. Consequently, active thermodynamic cycles have to be regularly distributed, as far as possible, following the stalling possibilities of the engine. Theoretically, the frequency of the active thermodynamic cycles can be multiplied by the number of cylinders for the best regularity and less torsion vibration.

One active thermodynamic cycle per several passive thermodynamic cycles is an interesting minimum corresponding to the highest frequency. Nevertheless, ratios between active and total cycle numbers are limited to: '1/2, 1/4, 1/6, 1/8, 1/10 ... 2/4, 2/8 ... which also correspond to the fraction of the active cycle power delivered by the engine. Consequently, it is possible to adapt the power and torque capacities of the engine to another limitation which is due to the actual maximum power of the electric propulsion chain. It would be useless to get engine capacities that we cannot reach for another reason. Good power adaptation of the engine provides efficiency gains even at high vehicle speed and high power. The flywheel can follow because a flywheel can deliver high power during a short period.

Of course, frictions and thermodynamic losses in the engine are not totally eliminated during the passive phases, but we do not have to consume energy for restarting the engine like in the usual stop and start systems. However, these losses can be minimized in many ways: three cylinders engine, low speed engine, cam-less engine, etc. . . . . . The passive phases provide new opportunities because, during these phases, we can open the suction valves in order to avoid useless air compressions and associate losses in the cylinders. In addition, we preserve compressed air at the engine intake, if any.

For opening the suction valves, additional actuators are anticipated alongside the existing valves system. They do not require the same level of accuracy than the valves system does. Consequently, many actuators such as, electric, hydraulic, electro-hydraulic, pneumatic . . . can be designed for this function. Some of them are currently under development. Thanks to the synchronous electric machines of the propulsion chain, we can easily determine piston positions in the cylinders and trigger the valve openings at the right time.

At contrary and still during the passive phases, if the suction valves are opened during unfired air compression, thermodynamic losses drastically increase alongside the engine braking torque. By controlling the opening point, we can control the engine braking and even get an engine braking "on demand."

In the passive phases, the torque necessary to propel the vehicle creates a reverse torque on the engine shaft due to the planetary gear mechanism. The equilibrium is achieved by adjusting the power going through the electric propulsion chain but this last has power limits. Consequently, we may have, to increase the resistive torque of engine and, to call for more engine braking.

The engine braking "on demand" can be also very useful regarding the regenerative braking because the torque for accelerating the flywheel might be limited by the reverse torque at the engine shalt, for the same reason. Consequently, more kinetic energy can be recovered and save. Note that in electric vehicles, the braking power often exceeds the battery capability and only a modest percentage of the kinetic energy is effectively recovered.

With electric valves the closing-opening sequence can be easily modified at the control unit level and additional actuators are no longer necessary. They bring flexibility to the invention.

Torsion vibrations can greatly reduce crankshaft life, if not cause instantaneous failure, if the crankshaft runs at or through resonance. Torsion vibration peaks occur when frequency of a repeated external torque gets close to one of the crankshaft natural frequencies. In the invention, a brief positive torque during the active thermodynamic cycles is followed by a relatively long and weak negative torque. Vibrations in the first period are deadened in the second period. In addition, more the vehicle speed is low; more the flywheel is mechanically connected to the crankshaft through the gears. That eases the work of the damper installed at the end of the crankshaft. This last can have a narrower operating range centered on high vehicle speeds. Gears fatigue increases a little bit, but torques and stresses can be accurately controlled through the pilot shaft in this type of power-train. It is due to the proportionality of the torques in a planetary gear mechanism.

Many well-known means can be used to shut down the fuel supply most depending upon engine system type. In direct or indirect fuel injection, the simplest is to keep injectors closed during the passive phases. Direct injection is convenient when invention is applied to each cylinder. For a carburetor, the best is to close the fuel input at the Venturi level with a small valve. Numerous configurations exist, but as they all compete for the best control of the flow, the fuel shutting should not be an issue.

At continuous vehicle speed, the flywheel is progressively slowed down, for minimizing air friction, for increasing regenerative braking availability and for reducing power in the electric propulsion chain. It is why the control unit takes into account a preset "power wearing" which permanently decreases the flywheel speed in the calculations.

To control a series-parallel architecture built around a planetary gear mechanism is usually made through the pilot shaft either by controlling its rotation speed or its torque or its power or a combination of the three. Here after, power option has only been considered for simplification.

When starting in another mode, power levels have to be maintained during the shifting while the accelerator pedal gets a different effect in the coming mode. To tackle the situation is the pedal corrector function, provide it receives reliable information. In the invention arrangement, it is possible to calculate the resistive power and even power in all the shafts from the speed behavior of the flywheel during the previous period of the control unit sequencer. Thanks to the flywheel, we have an accurate reference which does not change during the vehicle lifetime and is not affected by external events. The aerodynamic forces on the flywheel can also be introduced into the calculations for better accuracy.

The actual inertia and mass of the vehicle can also be calculated but only when the engine speed is constant during a sequencer period. At this condition, there is a mathematical relation between the vehicle and the flywheel inertia.

The invention is compatible with most of the known techniques for improving engine efficiency: EGR, downsizing, air compression, injection, etc. . . . , with impacts only at low vehicle speeds; impacts, which are not necessary negative.

The invention principles could also be considered for parallel hybridization, i.e. an electric motor directly actuating the wheels in parallel with the engine, with or without clutches. During the passive phase, the battery or the super-capacity should provide necessary power to drive simultaneously the vehicle and the engine. During the active phase, the engine reloads the electricity storage, thanks to the motor working as a generator. Unfortunately, the battery cannot stand frequent cycles without lifetime damage, so flywheel has been proposed as an alternative more resistant to cyclic stress. However, in this power-train architecture, an additional system to handle speed variations is required. It should allow vehicle and engine constant speed while the flywheel has to continuously slow down for delivering its energy. Unfortunately, such systems use friction. They are not reliable; they don't have a good efficiency, and they cannot avoid some sliding. Nevertheless, this solution works in specific cases, and theoretically the invention could be also applied for this type of power-train.

Whatsoever how the invention is used; it can be combined with additional energy sources as batteries or ultra-capacities. The batteries can be designed for electrical balance only, or sized to be plug to the national grid. The principle is to benefit of temporary useless capacities of the electric propulsion chain for increasing electric mobility share. These combinations increase the applicability of the invention.

DESCRIPTION OF THE PREFERRED EMBODIMENTS

The variables and parameters used in the control-command are listed here after. Some are definitions only; some others should be preloaded or measured or calculated in the Control unit.

DEFINITIONS i Time index of the sequencer
A % Accelerator pedal position
A' % Corrected position of the accelerator pedal in active phase
A" % Corrected position of the accelerator pedal in passive phase
B % Braking pedal position
Ao, A'o %, A"o % Initial values of the accelerator pedal positions
Preloaded Data:
Wemax Electric motor maxi speed
Wgmax Generator maxi speed
Wmmax Engine maxi speed
R Gear ratio of the planetary gear mechanism in operation
If Flywheel Inertia
Iv Vehicle Inertia at the motor shaft
Pw Power wear of the flywheel
Pfmax Flywheel maxi power
Limits Generator, inverter and motor limits
(Torques, Powers, Base speeds, Maxi speeds)
S Maxi engine speed variation for setting the vehicle inertia
Cmf Engine friction torque in passive phase
Tlow Period of low power before shifting in pulsatile mode
Measured or calculated data: They are gathered in a "Calculation Block" which is used by all modes with minor differences, which appear on the Logic-diagrams.

| | | |
|---|---|---|
| Wei | Electric motor speed @ time i | Memory |
| Wgi | Generator speed @ time i | Memory |
| We | Electric motor speed | Measured |
| Wg | Generator speed | Measured |
| Wm | Engine speed | f(We, Wg) |
| Pkf | Flywheel kinetic power | f(If, Wgi, Wgi + 1) |
| Pke | Vehicle kinetic power | f(Iv, Wei, Wei + 1) |
| Pchi | Electric chain power @ time i | Memory |
| Pch | Electric chain power | F(Pchi, Pke, Pkf, Pw) |
| Pchmax | Electric chain maxi power | f(We, Wg, Limits) |
| Pm | Engine power | f(Pkf, Wm, r) |
| Pv | Vehicle resistive power | f(Pkf, Wm, r) |
| Pg | Generator power | f(Pchi, Pkf, Pke) |

FIG. 1 shows typical curves of engine efficiency with its best zone. By way of an example, A is an engine operating point at low vehicle speed without the invention thus with an engine continuously working. In B, the engine with the invention develops the same amount of energy but discontinuously. To produce the same amount of energy, power in B should be higher than in A when the engine is working. Passive phases four times longer than the active phases request power five times higher during the active phases that roughly double the efficiency.

Figure 2A:
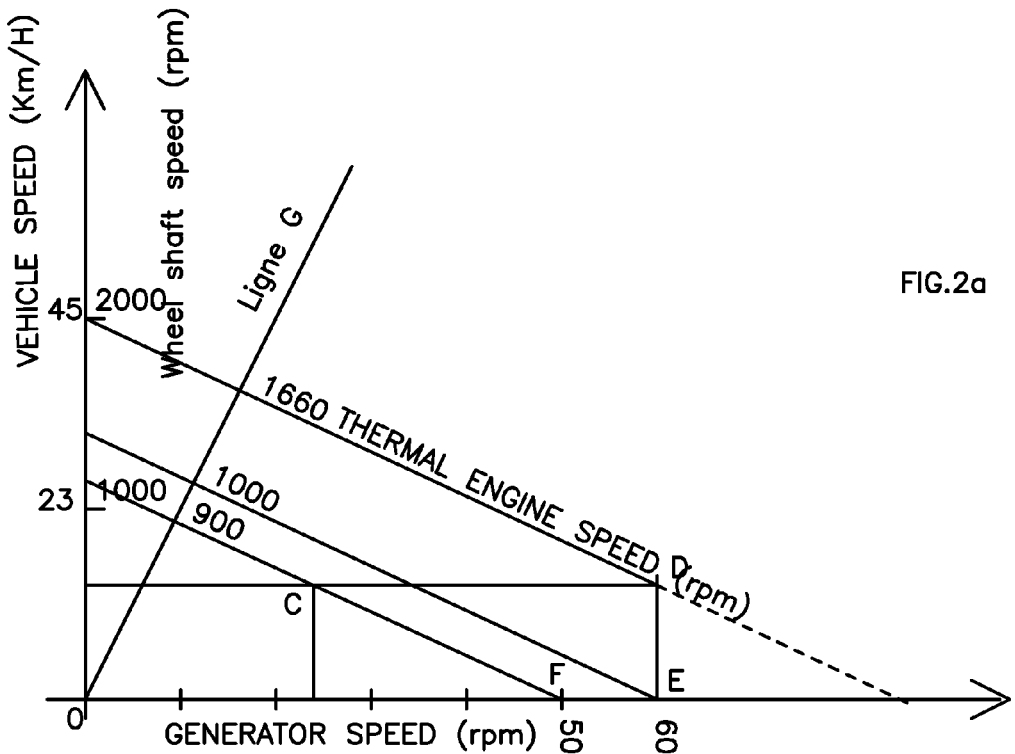
FIG. 2a shows the speeds characteristics.
Figure 2B:
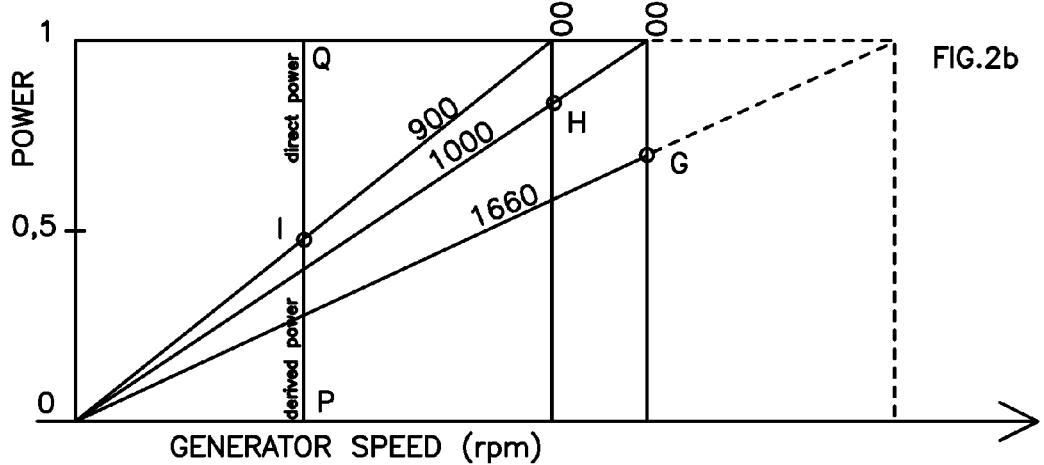
FIG. 2b shows the power characteristics; of the device according to the invention at very low vehicle speed.

FIG. 2: The FIG. 2*a* shows the speeds characteristics while the FIG. 2*b* shows the power characteristics of a planetary gear mechanism which has a negative gear ratio and a power derivation arrangement. The two figures are vertically aligned to point out their geometric relationship. Here, they particularly show a case at very low vehicle speed, even null.

As represented, the generator speed oscillates between 2500 and 6000 rpm, whereas the engine speed oscillates between 900 and 1660 rpm, with a 6000 rpm limit for the generator speed. For this particular case, the control unit should maintain the engine operating point in the trapezoid CDEF.

The points G, H and I give the relationship between the direct power (part of the engine power going to the output shaft) and the derived power (part of engine power going to the pilot shaft) for some particular engine speeds: 900, 1000 and 1660 rpm. For each point inside the trapezoid CDEF, we can associate a ratio between the direct and the derived power (ex: IQ/IP). This planetary gear balance gives the opportunity to the electric propulsion chain to control not only the derived power but also the direct power, even if the total power exceeds its maximum allowable power. This remark is important because it contributes to minimize the electric propulsion chain, so its cost.

In the trapezoid CDEF, oscillations of the generator speed should not place the engine speed below its stability limit if this option is chosen. At very low vehicle speed, even null, the oscillation range (ex: FE) becomes narrow to meet this requirement. Fortunately, oscillation amplitude could be reduced to the minimum kinetic energy necessary for maintaining the passive phase.

Figures 3A, 3B:
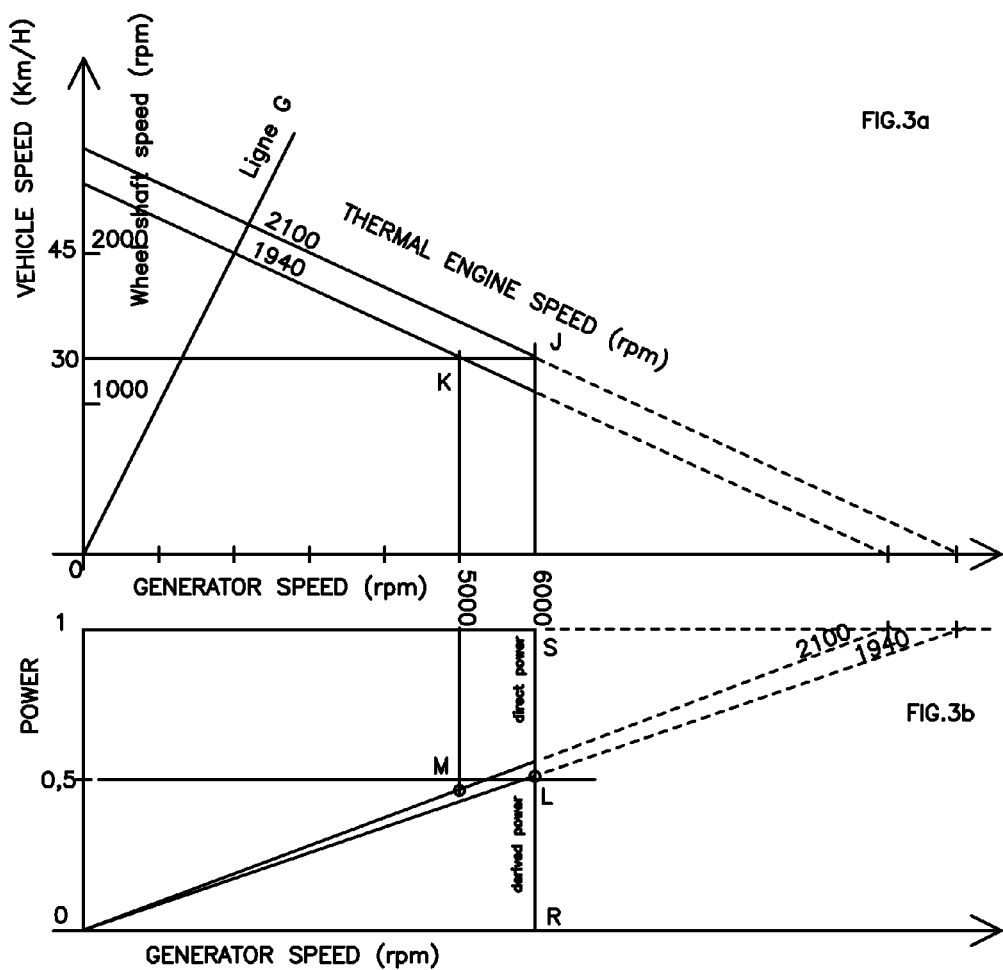
FIG. 3a shows the speeds characteristics.
FIG. 3b shows the power characteristics; of the device according to the invention at low vehicle speed.

FIG. 3: The FIG. 3a shows the speeds characteristics while the FIG. 3b shows the power characteristics of a planetary gear mechanism which has a negative gear ratio and a power derivation arrangement. The two figures are vertically aligned to point out their geometric relationship. Here, they particularly show a case at low vehicle speed, around 30 km/h.

On the segment KJ, the generator speed oscillates between 5000 and 6000 rpm and those of the engine between 1940 and 2100 rpm, with 6000 rpm limit for the generator. The points L and M give the ratio (ex: LS/LR) between the direct power and the derived power. This ratio is close to 0.5, which makes it possible to the electric propulsion chain to control roughly the double of its allowable power. This remark is important because it contributes to minimize the electric propulsion chain, so its cost. In addition, we can see that the phases can be short and speed variations narrow for a better driving comfort.

FIG. 4: The FIGS. 4a and 4b schematize a series-parallel power-train with a first planetary gear mechanism for power derivation V (2) according to the invention which comprises:
- a first planetary gear mechanism (2) for power derivation, having an input shaft, an output shaft and a pilot shaft;
- an electric generator (4) connected to the pilot shaft, having a high inertia rotor or a rotor coupled to a flywheel (3);
- an electric motor (6) able to absorb power from the generator (4) coupled to the output shaft driving the vehicle axle;
- a battery (8) able to absorb or to release the electric power balance of the vehicle;
- an engine (1) including an engine shaft connected to the input shaft of the planetary gear mechanism (2) to provide power to the system;
- a valve system (11) for cyclically shutting down the fuel supply for the engine (1);
- an inverter (7) able to transfer and control the electrical energy between the generator (4) and the motor (6) both reversible;
- a control-command unit of the system (not represented).

The FIGS. 4c and 4d schematize a series-parallel power-train, with a first and a second planetary gear mechanism V (2) and Y (9) for power derivation according to the invention which comprises in addition to the previous architecture:
- a second planetary gear mechanism (9) for power derivation with a higher gear ratio than the first one, having an input shaft, and an output shaft respectively connected to the input shaft and output of the first planetary gear mechanism (2);
- a selector (10) for choosing one of the first and second planetary gear mechanisms (2) or (9) to be in operation by connecting the relevant pilot shaft to the generator rotor (4).

It is reminded that the double planetary gear mechanism is recommended for the invention because it allows:
- to decrease the gear ratio of V (2) for improving kinetic energy storage at low vehicle speed,
- to increase the gear ratio of Y (9) for minimizing inertia effect at high vehicle speed.

Fuel supply for the engine (1) is cyclically open and closed by the valve (11), or by other shutting devices, to create engine active and passive phases. The shutting point can be single or multiple and close to each cylinder in order to be more efficient and quicker to operate.

Figure 4E:
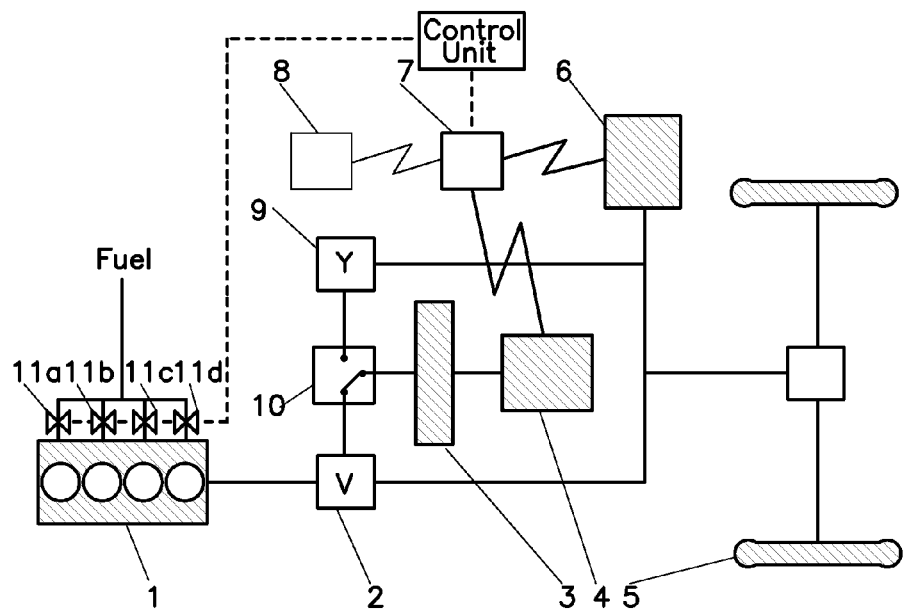
FIG. 4 schematizes a series-parallel power-train; with one planetary gear mechanism on the FIGS. 4a and 4b, with a double planetary gear mechanism on the FIGS. 4c and 4d, and the invention applied to each cylinder on the FIG. 4e.

The FIG. 4e represents the invention when it is applied on each cylinder. Each cylinder has its own valve (11a, 11b, 11c, 11d). This arrangement is most dedicated to the engine with direct fuel injection, each injector playing the role of a valve. The dash line indicates the main actions of the control unit on the valves and on the inverter (7).

The arrows indicate the direction of the power flows depending to the cases: To simplify, resistive power on the vehicle has only been considered positive but obviously, the system can work in regenerative braking mode also.

Configuration with one planetary gear mechanism V (2):
FIG. 4a: the valve (11) is open, and the engine (1) is active,
FIG. 4b: the valve (11) is closed, and the engine (1) is passive.

Configuration with two planetary gear mechanisms V (2) and Y (9) at low vehicle speed:
FIG. 4c: the valve (11) is open, and the engine (1) is active while Y (9) is idle,
FIG. 4d: the valve (11) is closed, and the engine (1) is passive while Y (9) is idle.

Figure 5:
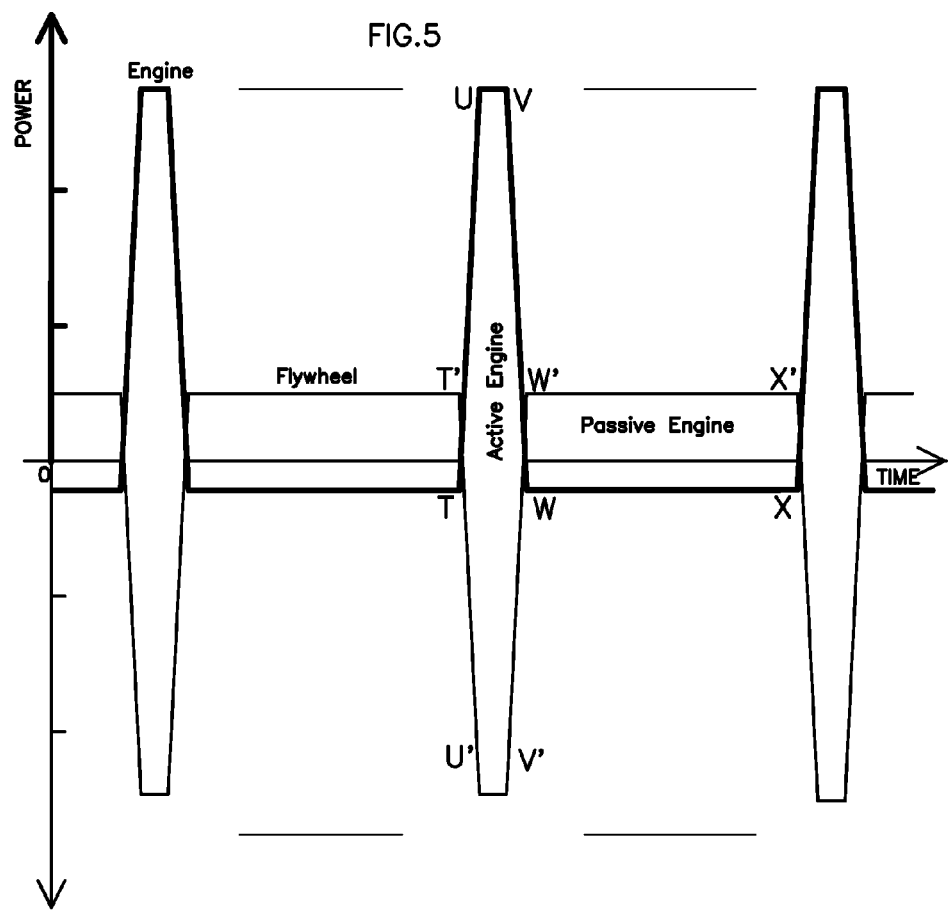
FIG. 5 shows the periodic fluctuations of the engine and the flywheel powers in the pulsatile mode.

FIG. 5 shows the periodic fluctuation of the engine and the flywheel powers in pulsatile mode. The trapezoid TUVW represents the engine power during the active phase and the segment WX the same during the passive phase. The segments TU and VW are tilted because power variations take time to be completed. On UV, engine is the unique source of power for vehicle propulsion. On WX, the negative engine power represents its losses.

On T'T the flywheel continues to lose power to compensate power ramps, then on TU' the flywheel starts to store the excess of the engine power. Kinetic energy continues to be stored on U'V'W, after that, kinetic energy is progressively restored to propulsion on WW' to compensate engine ramps. On W'X' kinetic energy is the unique source of power for propulsion and engine losses.

Figure 6:
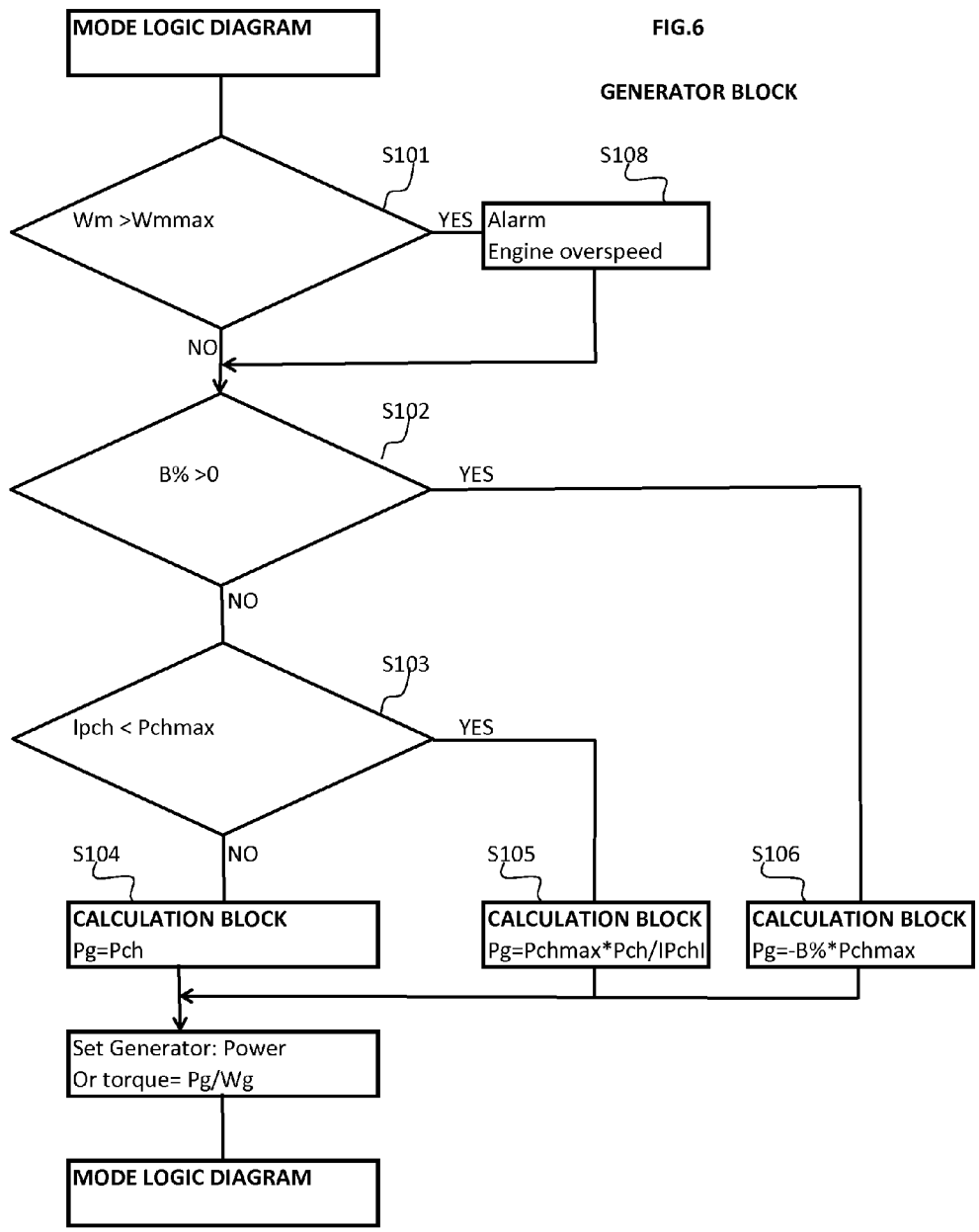
FIG. 6 is the common part of the logic-diagram for setting the generator power in all the modes.

FIG. 6 shows the logic-diagram which is common to all modes when the electric chain power, so the generator power, Pg, has been set. This power is calculated by a Calculation Block with minor adaptations to the mode in operation. The logic-diagrams are self-explanatory, so only additional explanation is provided here after.

Bock 101, If Wmmax>Wpmax and Wemax, the condition Wm<Wmmax is sufficient to get Wp<Wpmax and We<Wemax due to the characteristic of a planetary gear mechanism which has a negative gear ratio.

Step S108, when alarm sounds, the driver should progressively release the accelerator pedal of the engine.

Step S102, when the brake pedal is activated B % of its first stroke, the electric propulsion chain works reverse in a regenerative braking mode: the motor works as generator and the generator works as motor. Above 100%, the remaining part of the pedal stroke is used for a classic hydraulic braking.

Step S106, the regenerative braking should be progressive for that power of the electric propulsion chain is proportional to B %.

Steps S103, S104 & S105, the calculated generator power, Pg, should be compatible with the actual maximum power of the electric propulsion chain, Pchmax, which is regularly reevaluated by the Calculation Block.

Figure 7:
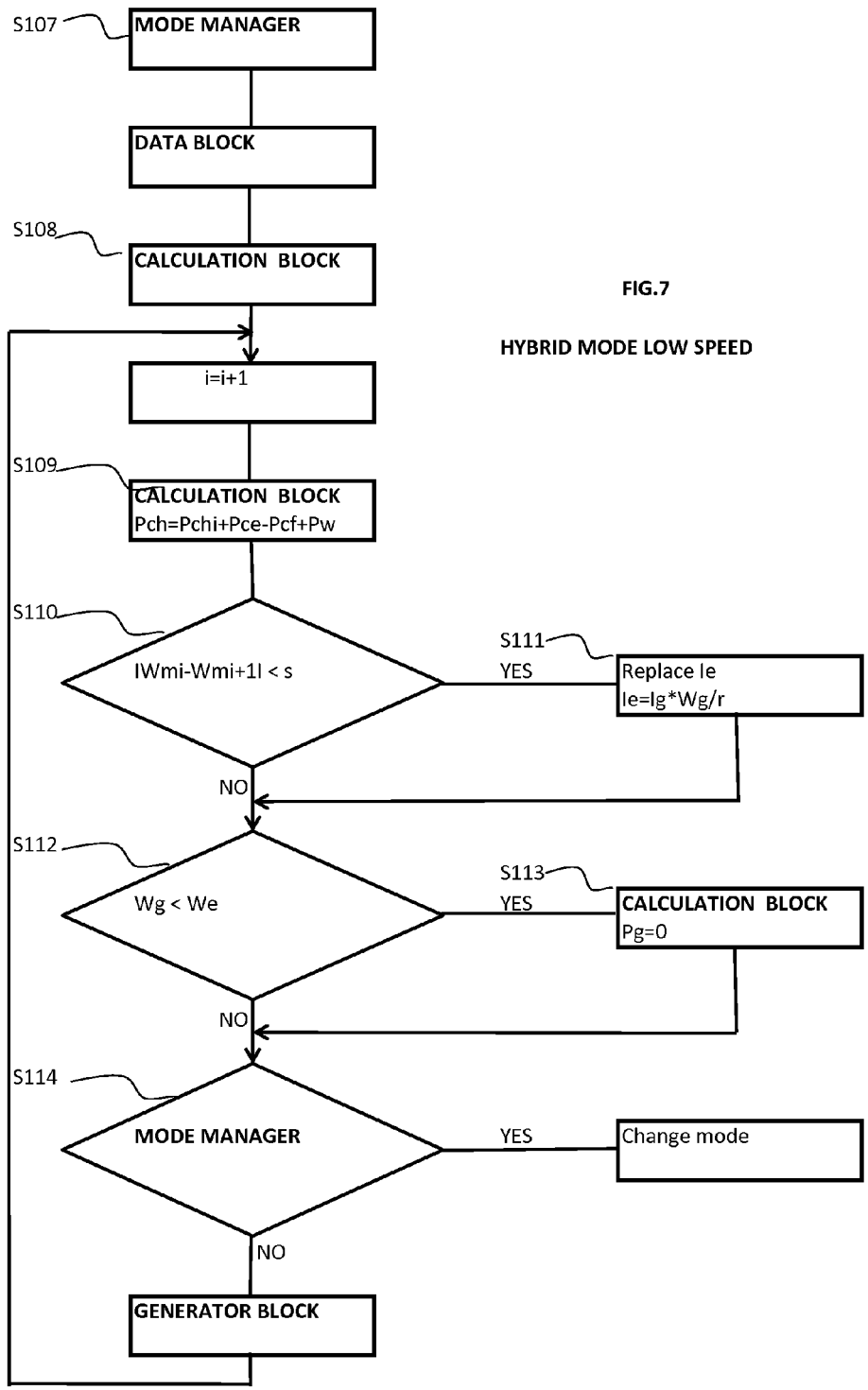
FIG. 7 is the specific part of the logic-diagram to set the generator power in the hybrid mode at low vehicle speed.

FIG. 7 shows the logic-diagram to set the generator power Pg, in hybrid mode at low vehicle speed.

Step S107, A Mode Manager decides the vehicle mode according to a mix of preloaded criteria and driver instructions.

Step S108, the task of the Calculation Block at this step is to initialize variables at the time "i" which are necessary in the calculation at the time "i+1" of the sequencer.

Step S109, at the time "i+1", the generator power during the period "i" is corrected of the difference between the kinetic power variation of the vehicle and those of the flywheel during the period "i". In addition a wearing power, Pw, is added in order to slow down progressively the flywheel for minimizing its friction losses and for reducing power in the electric propulsion chain.

Steps S110 & 111, the purpose is to calculate actual inertia of the vehicle when the engine speed is constant during a sequencer period. As perfect equality is difficult to achieve, we accept a small margin, "s" before preceding the calculation. The current vehicle inertia is deducted from the flywheel inertia which is an invariant all along vehicle lifetime.

Step S112, here the generator speed is maintained close to the motor speed to ease an eventual shifting of mode.

Step S114, at each sequencer period, the Mode Manager checks if current mode has to be changed according to some preloaded criteria or driver instructions.

Figure 8:
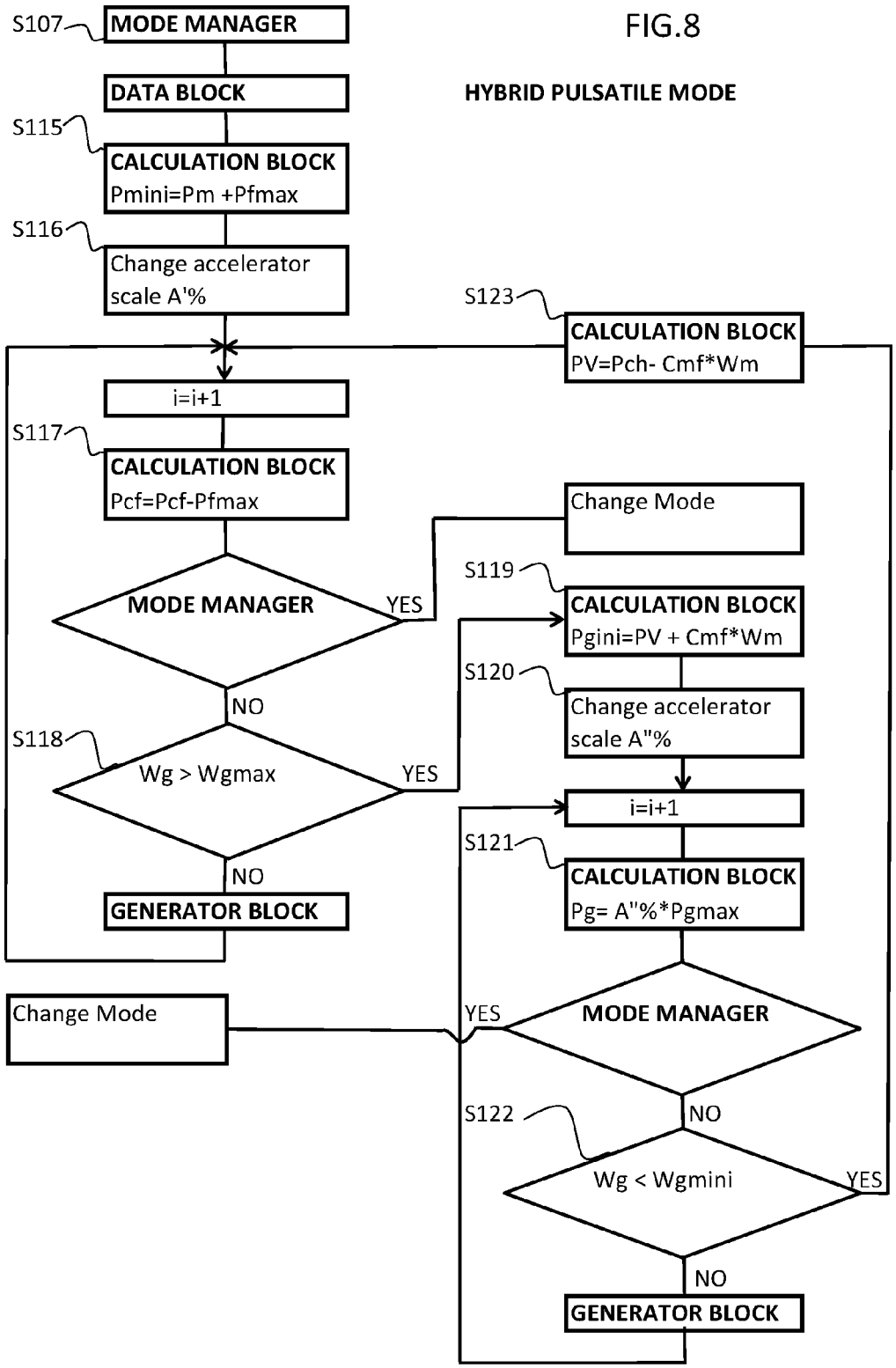
FIG. 8 is the specific part of the logic-diagram to set the generator power in the pulsatile mode.

FIG. 8 shows the logic-diagram to set the generator power, Pg, in hybrid pulsatile mode at low vehicle speed.

Step S107, the Mode Manager decides vehicle mode according to a mix of preloaded criteria and driver instructions.

Step S115, the purpose of the Calculation Block at this step is to initialize variables at the sequencer time "i" which are necessary for the next calculation at the time "i+1". The maximum flywheel power is added to the initial engine power.

Step S116, to maintain initial power of the engine, a table provides a theoretical position A'o % of the accelerator pedal while its actual position is Ao %. Consequently, a pedal converter has to convert A % in A'%. For instance: A'%=A %*A'o %/Ao %. The driver should also have a same acceleration feeling what so ever the mode. Note: As acceleration in the hybrid mode low speed is taken as reference, pedal position has not to be reconverted when we shift to this mode.

Step S117, the Calculation Block should take into account the energy stored in the flywheel. Consequently, Pkf is replaced by Pkf–Pfmax in the calculation.

Step S118, when the flywheel meets its maximum speed, fuel supply is closed shifting the engine into the passive phase.

Step S119, the generator power has to be initialized at the sequencer time "i" for the next calculation at the time "i+1" with Pg=Pv+Cmf*Wm. Here, engine friction losses are assumed to be proportional to a constant torque.

Step S120, a table provides the theoretical position A"o % of accelerator pedal while its actual position is Ao %. Consequently, the accelerator converter should compensate pedal position in order to maintain the initial power and the same acceleration feeling. For instance: A" %=A %*A"o %/Ao %.

Step S121, the calculation of the Calculation Block has to be adapted because the power is only provided by the generator. Consequently, Pg should be replaced by Pg=A" %*Pgmax.

Step 122, when the flywheel meets its minimum speed, fuel supply is opened shifting the engine into the active phase.

Step 123, prior to the mode shifting vehicle resistive power has to be recalculated: Pv=Pch+Cmf*Wm.

Figure 9:
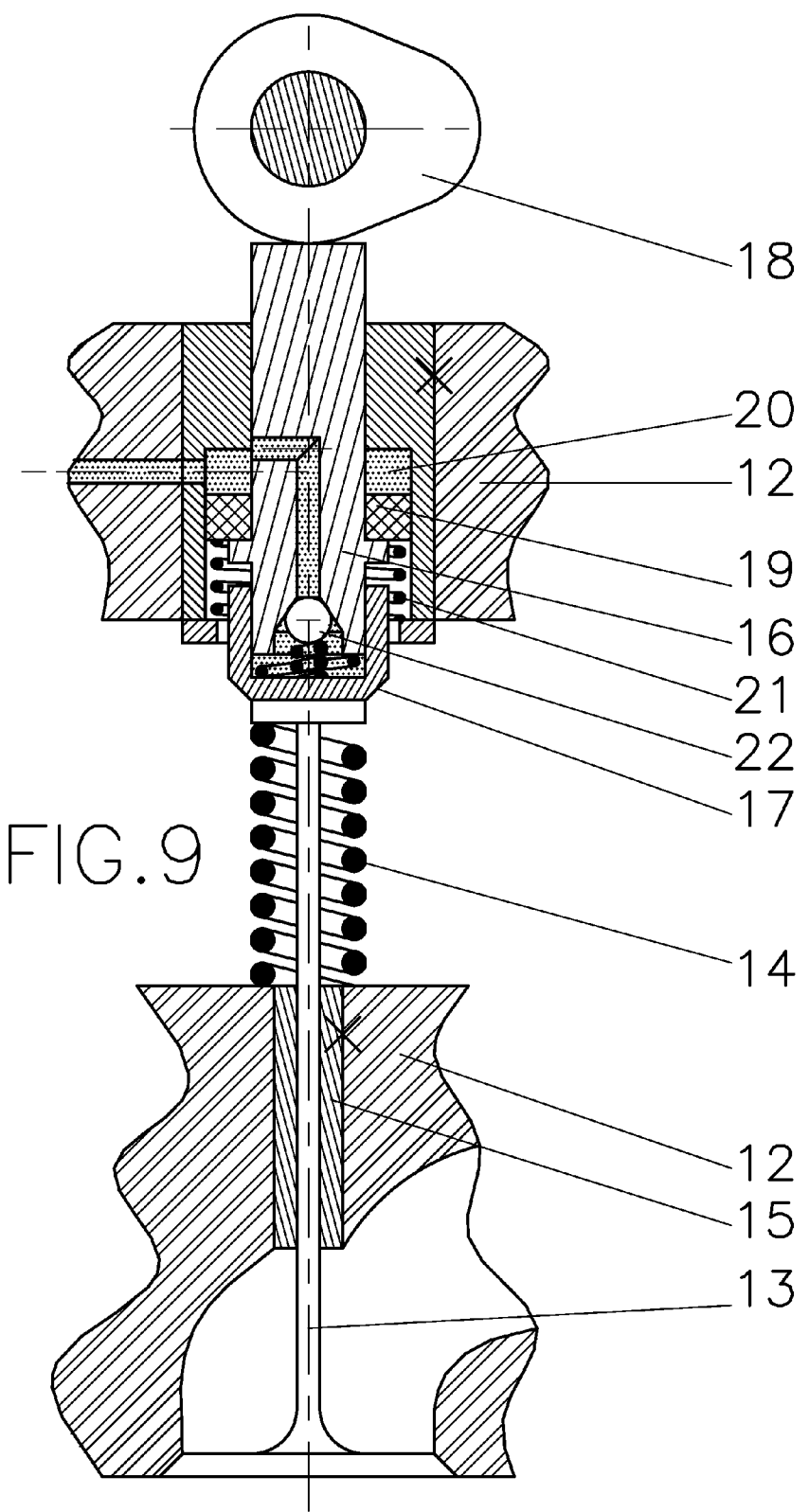
FIG. 9 shows a hydraulic device for keeping an engine valve open during the passive phase.

FIG. 9 shows a hydraulic device for keeping a valve open during the passive phase or during a non-fired air compression. In the passive phases, the valve (13) is pushed upward by the spring (14) through the guide (15) in order to close the air intake arranged in the engine body (12). For opening the valve (13) during the active phases, an overhead cam shaft (18) consecutively forces downward, the plunger (16), the hydraulic lash adjuster (17) and finally the valve (13). For opening the valve (13) during the passive phases, the oil pressure (dotted areas represent oil) is increased in the jack chamber (20) successively pushing the ring (19), the plunger (16), the hydraulic lash adjuster (17), and finally the valve (13). The springs (21) and (14) ensure the reverse operation when the oil pressure returns to being low. The hydraulic lash adjuster (17) is a known device. The concept is a self-adjusting thickness by pumping oil in its inner chamber without return due to the chock valve (22). That keeps the plunger (16) and the adjuster outer cylinder (17) in contact with the cam shaft (18) and the valve (13) at all times when the valve (13) is actuated by the cam shaft (18). The adjusted thickness should be maintained during the passive phases that imply relative oil tightness and high frequency. The originality of this device is to integrate the hydraulic lash adjuster (17) in the hydraulic jack (20) and to use the same oil intake.

The embodiments and its example explain above are considered in all aspects as illustrative and not restrictive. There may be many other modifications, changes and alterations without departing from, the scope or spirit of the mains characteristics of the present invention.

INDUSTRIAL APPLICABILITY

The technique of the invention is preferably applicable to the manufacturing industries of automobiles and other relevant industries. To illustrate, we propose here after, a sized and nonrestrictive example:

A 1500 kg vehicle which requires 4 Kw for running at 20 km/h without road grade or wind is considered. Its 10 Kw electric chain limits the engine power at 24 Kw (10×2+4), refer to [0051] for multiply by 2.

Its 0.7 Kg*m² flywheel is pulsed between 5000 and 6000 rpm. The variation of the kinetic energy, 42 KJ, drives the vehicle during a passive phase of 10 seconds. Then the engine is fueled in order to reach 24 Kw during an active phase of 2.2 seconds, raising the pilot shaft speed up to 6000 rpm.

The power is increased around 6 times (24/4) during the active phase compare to the power average. We can expect a twice better efficiency according to the usual engine performances.

For a three cylinders engine running at 1800 rpm, we get 100 active thermodynamic cycles for 1000 passive thermodynamic cycles (1×3 cycles per one complete rotation of the crankshaft). In a planetary gear mechanism with a gear ratio of −0.2, 100% at 0 km/h, 73% at 10 km/h, 57% at 20 km/h, 47% at 30 km/h of the power transit between the flywheel and the engine through the gears without any energy conversion so without transformation losses.

It is possible to lengthen the active phase but that increases the speed variations. A compromise has to be found with the driving comfort. A higher frequency eases the compromise. Note that the frequency can be much higher than in any stop and start system.

When the invention is applied to each cylinder of a three cylinders engine, rotating at 1800 rpm, with one active thermodynamic cycle for seven passive thermodynamic cycles (one cycle for a complete rotation of the crankshaft per cylinder). We get 11 active thermodynamic cycles per second (30×3/[1+7]). A 11 Hz frequency is also the frequency of the flywheel speed variations. At this frequency, the speed variations are small and let the flywheel available for its other functions (engine working point, regenerative braking, performances boosting).

The invention claimed is:

1. A power transmitting system for hybrid vehicle comprising:
   a first planetary gear mechanism (2) for power derivation, having an input shaft, an output shaft, and a pilot shaft;
   an electric generator (4) connected to the pilot shaft, having a high inertia rotor or a rotor coupled to a flywheel (3) which drives the vehicle, the generator (4) and the engine (1) during passive phases;
   an electric motor (6) able to absorb power from the generator (4) coupled to the output shaft driving the vehicle wheels (5);
   a battery (8) able to absorb or to release the electric power balance of the vehicle;
   an engine (1), including an engine shaft connected to the input shaft of the planetary gear mechanism (2), which drives the vehicle, the generator (4) and the flywheel (3) during active phases;
   a valve system (11) for cyclically shutting down the fuel supply for the engine (1) during the passive phases and opening the fuel supply for the engine (1) during the active phases;
   an inverter (7) able to transfer and to control the electrical energy between the generator (4) and the motor (6) both reversible;
   a control-command unit of the system which provides calculation resources and triggers the actives phases and the passive phases.

2. The power transmitting system for hybrid vehicle according to the claim 1 comprising in addition:
   a second planetary gear mechanism (9), for power derivation with a higher gear ratio than the first planetary gear mechanism (2), having also an input shaft and an output shaft respectively connected to the input shaft and to the output shaft of the first planetary gear mechanism (2);
   a selector (10) for choosing one of the first and the second planetary gear mechanism (2) or (9) to be in operation by connecting the relevant pilot shaft to the rotor of the generator (4).

3. The power transmitting system for hybrid vehicle according to the claim 1, where in the valve system (11) cyclically closes and opens the fuel supply of each engine cylinder with a phase displacement to create active phases where thermodynamic cycles are unchanged except power and passive phases where active thermodynamic cycles become passive.

4. The power transmitting system for hybrid vehicle according to the claim 3, where in the ratio between the number of the active thermodynamic cycles and the number of the passive thermodynamic cycles is used to adapt the power and torque capabilities of the engine (1) to the actual maximum power of the electric propulsion chain.

5. The power transmitting system for hybrid vehicle according to the claim 3, where in the suction or the exhaust valves (13) of the engine (1) are kept open during the passive phases in order to remove useless air compressions and associated losses in the cylinders.

6. The power transmitting system for hybrid vehicle according to the claim 3, where in the suction or the exhaust valves (13) of the engine (1) get opening during air compression in the passive phases in order to increase and to control the braking torque of the engine (1).

7. The power transmitting system for hybrid vehicle according to the claim 1, where in the behavior of the flywheel (3) is taken as reference by the control-command unit for calculating the actual inertia of the vehicle.

8. The power transmitting system for hybrid vehicle according to the claim 1, where in the engine (1) or each of its cylinders is fueled at a cycling flow rate which has a maximum during the active phases and a minimum during the passive phases.

* * * * *